Figure 9:
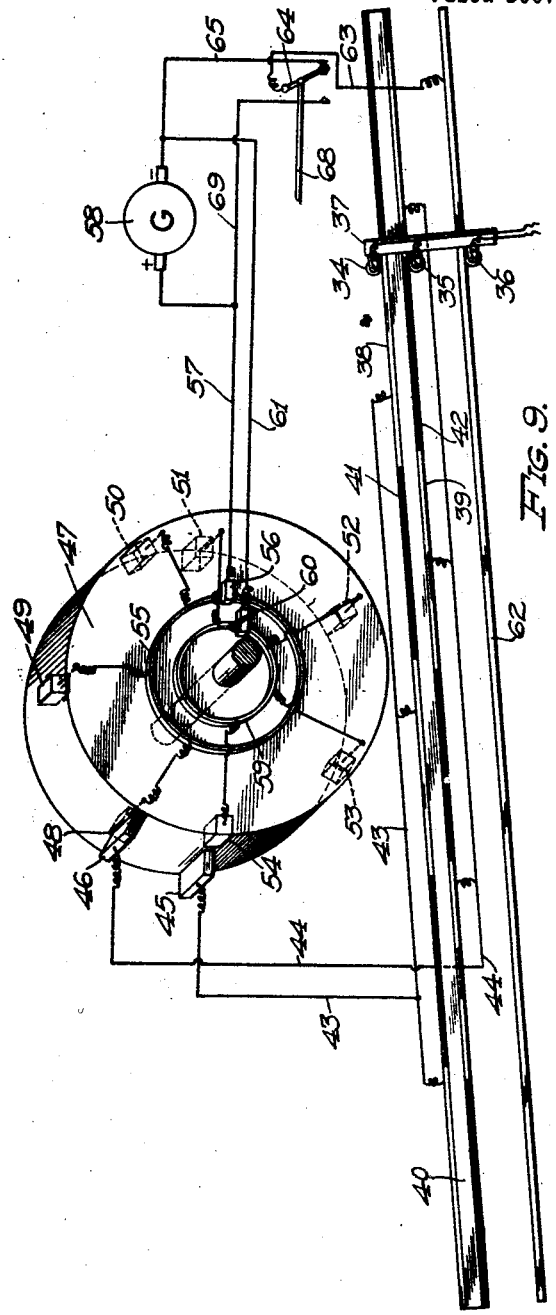

July 7, 1925.
O. K. CLEAVELAND
WAVE POWER PRODUCING APPARATUS
Filed Dec. 9, 1924
1,544,725
3 Sheets-Sheet 1
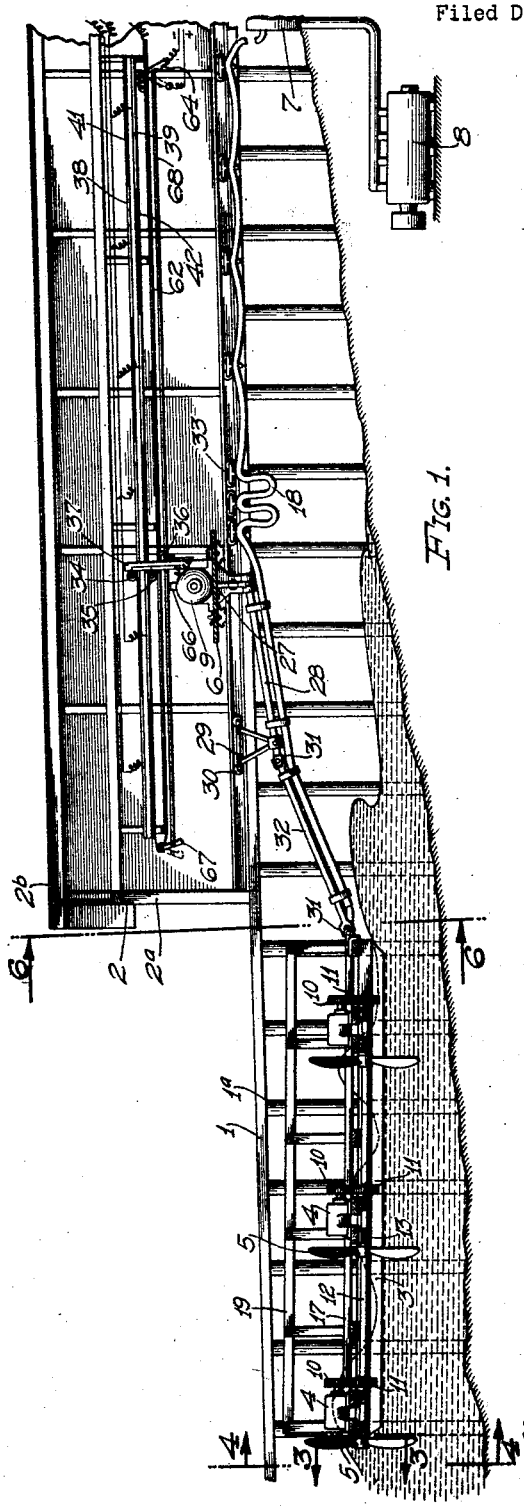
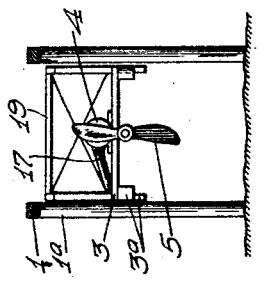
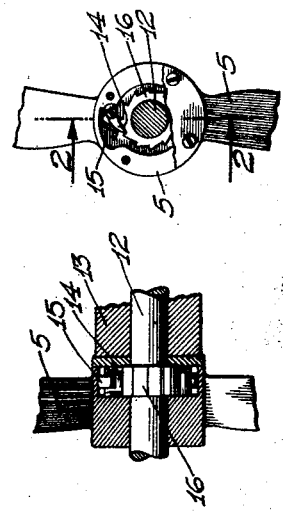
Inventor
O. K. CLEAVELAND.
By A. B. Bowman
Attorney

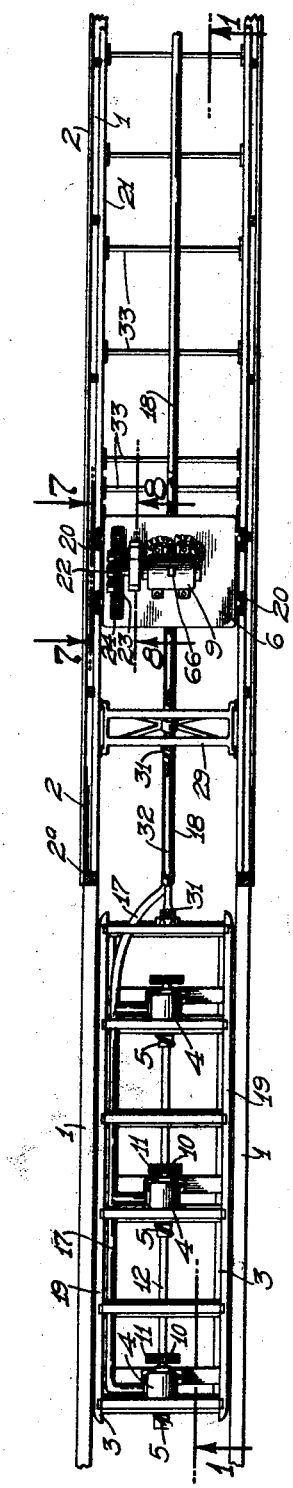

July 7, 1925.

O. K. CLEAVELAND 1,544,725

WAVE POWER PRODUCING APPARATUS

Filed Dec. 9, 1924  3 Sheets-Sheet 3

Inventor
O.K. CLEAVELAND
By A.B.Bowman
Attorney

Patented July 7, 1925.

1,544,725

UNITED STATES PATENT OFFICE.

O. K. CLEAVELAND, OF LONG BEACH, CALIFORNIA.

WAVE-POWER-PRODUCING APPARATUS.

Application filed December 9, 1924. Serial No. 754,750.

*To all whom it may concern:*

Be it known that I, O. K. CLEAVELAND, a citizen of the United States, residing at Long Beach, in the county of Los Angeles and State of California, have invented a certain new and useful Wave-Power-Producing Apparatus, of which the following is a specification.

My invention relates to a wave power-producing apparatus, and the objects of my invention are: First, to provide an apparatus of this class for converting the energy of the waves of the ocean or other waters into useful power; second, to provide an apparatus of this class in which the energy converting unit is at all times positioned in such a manner relatively to the waves as to receive the greatest effective impact therefrom; third, to provide an apparatus of this class in which the unit subjected to the force or impact of the waves is shifted seaward or landward at intervals to take care of the outgoing and incoming tide in order to position or retain said unit in the water most active or agitated by the waves; fourth, to provide an apparatus of this class whereby air is compressed in compressers operated by wave actuating propellers and stored in a pressure tank to which is connected an air motor; fifth, to provide a wave power-producing apparatus having a seaward and landward shiftable float supporting air compressers operated by wave actuated propellers; sixth, to provide a novelly constructed and timed means for shifting a float seaward and landward at intervals to take care of ebb and flow tide and position the float in water near the shore at all times; seventh, to provide a novel pier structure extending from the land into the water which serves as a guide for a shiftable float and a support and guide for a carriage for shifting said float; eighth, to provide a novelly constructed carriage for shifting said float seaward and landward and a novel means in connection therewith for retaining said float in a certain position; ninth, to provide a novelly constructed magnetically controlled brake mechanism for retaining said carriage in a certain fixed position when disconnected from a source of power; tenth, to provide a novelly constructed timing mechanism for controlling the movements of said carriage at regular intervals; eleventh, to provide a timing mechanism of this class for electrically controlling the movement of a carriage at regular intervals, in one direction, and at regular intervals in the opposite direction; twelfth, to provide a novelly constructed trolley means in connection with a carriage of this class; thirteenth, to provide as a whole a novelly constructed and arranged wave power-producing apparatus, and fourteenth, to provide an apparatus of this class which is simple and economical of construction proportionate to its functions, durable, automatic in its action and control, and which will not readily deteriorate or get out of order.

Figure 10:
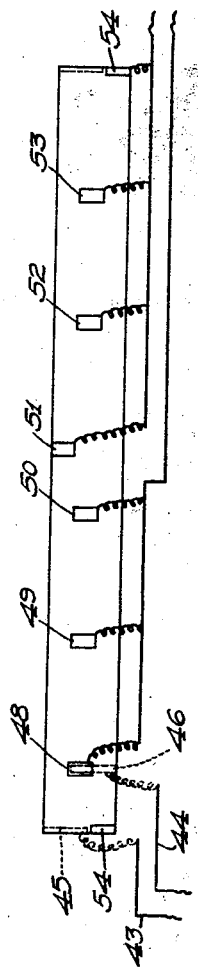

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of my apparatus, with the section taken through 1—1 of Fig. 5; Fig. 2 is an enlarged longitudinal sectional view of a fragmentary portion of a propeller and a journal support therefor, showing the ratchet means in the hub of the propeller, with the section taken through 2—2 of Fig. 3; Fig. 3 is an enlarged fragmentary view of the hub portion of one of the propellers, with the view taken through 3—3 of Fig. 1, showing certain parts and portions thereof broken away and in section to facilitate the illustration; Fig. 4 is an end elevational view of my apparatus, taken at 4—4 of Fig. 1; Fig. 5 is a plan view of my apparatus, showing the roof at one end of the pier or supporting structure broken away and in section to facilitate the illustration; Fig. 6 is a transverse sectional view of my apparatus, taken through 6—6 of Fig. 1; Fig. 7 is an enlarged side view of the carriage mounted on the supporting structure for shifting the float, showing the supporting structure fragmentarily, the view being taken at 7—7 of Fig. 5; Fig. 8 is an enlarged view of the brake mechanism for holding the carriage, shown in Fig. 7, stationary, the view in Fig. 8 being taken through 8—8 of Fig. 5, and the casing enclosing the brake mechanism being broken away at one side and shown in section to facilitate the illustration; Fig. 9 is a diagrammatic view, showing the timing mechanism for controlling the movement of the carriage and showing its relation with the generator, switch and trolley means, and Fig. 10 is a developed view of the periphery of the contact wheel of the timing mechanism shown in Fig. 9, showing the relation of the movable contact members thereof with the stationary contact members connected with the trolley conductor.

Like characters of reference refer to similar parts and portions throughout the several views of the drawings.

My wave power-producing apparatus, as illustrated in the drawings, consists essentially of a pier or supporting structure 1 built partly on the shore and partly in the water and provided at its shore end with a protecting superstructure 2, a float 3, upon which is mounted a plurality of air compressers 4 operated by propellers 5, a motor driven carriage 6 mounted on the shore end of the pier structure 1 and connected with the float 3, a storage tank 7 connected with the air compressers 4 on the float, an air turbine 8 communicating with and driven by the air in the storage tank 7, a trolley conductor means supported in the superstructure 2 contiguous to the path of the carriage 6, and a timed switch mechanism for regularly and intermittently controlling the flow of electric current to the conductors of the trolley conductor means and to the motor 9 on the carriage 6.

The pier or supporting structure 1 consists of two spaced apart rows of spaced apart piles 1ª, the piles in each row being secured relatively to each other. At the shore end of the pier structure 1 is mounted the superstructure 2, which consists of side walls 2ª and a roof 2ᵇ, the side walls extending upwardly from the two rows of piles. Between the two rows of piles extending out into the water is positioned the float 3 of any suitable construction and preferably in skeleton form. At each side of the float and extending downwardly therefrom are projections 3ª which extend the length of the float and provide a sluiceway for directing the water under the same toward the shore. On this float 3 is mounted a plurality of air compressors of any suitable construction, which are connected, by means of gears 10 and 11, to a shaft 12 extending longitudinally with the float and revolubly mounted in journals 13 at the under side thereof. On the shaft 12 are mounted a plurality of propellers 5 which are adapted to impart motion to the shaft 12 by means of pawls 14 mounted in the hubs of the propellers 5, which pawls are forced, by means of springs 5, in engagement with ratchet wheels 16 secured to the shaft 12 within the hubs of the propellers.

The outlet or discharge ports of the compressers 4 are connected to a common discharge conductor 17 which is mounted on the float 3 near one side thereof so as not to interfere with the revolving propellers. This conductor 17 is preferably connected by means of a flexible conductor 18 with the storage tank 7.

On the float 3 is mounted a framework 19, which extends upwardly from the float from the sides thereof and serves as a guide or stabilizing means to prevent the float 3 from tilting sideways when the sea becomes heavy.

The carriage 6 for shifting the float 3 seaward or landward, depending upon the condition of the tide, is provided with a plurality of toothed wheels 20 which ride in notches or recesses at the upper side of rails 21 secured to the upper portions of the two rows of piles and within the superstructure 2. The motor 9, which is mounted on the carriage 6, is provided on its shaft with a drive gear 22 which meshes with a pair of idler gears 23 which in turn mesh with other gears 24 secured to the two shafts upon which the toothed wheels 20 are mounted for driving the latter along the rails 21. At either side of the carriage 6 are provided downwardly extending brackets 25 which are provided at their lower ends with rollers 26 which ride within the channel portions of the channel shaped rails 21 for retaining the toothed wheels 20 in engagement with the rails. This carriage 6 is provided with another downwardly extending bracket 27 at the middle portion thereof, to the lower end of which bracket is secured a rod 28 which extends seaward and is supported at its outer or seaward end in another carriage 29 which is provided at its opposite ends with rollers 30 which also ride in the channel portions of the rails 21, as shown best in Figs. 1 and 5. The seaward end of the rod 28 is connected by means of a universal joint 31 with a rod 32 which is connected at its opposite end by means of another universal joint 31 with the float 3, as shown best in Figs. 1 and 5. Thus, it will be seen that when the carriage 6 is moved along the rails by its motor, the same will shift the float 3 irrespective of the condition or height of the water.

On the opposite side of the carriage 6 from the carriage 29 are provided a plurality of other carriages 33 which also ride in the channel portions of the rails 21. On these carriages 33 is supported the flexible conductor 18 at certain intervals, so that when the carriage 6 moves landward on the rails 21, the flexible conductor 18 is folded or looped, as shown in Fig. 1. From the connection with the conductor 17 to the first carriage 33 the flexible conductor 18 is preferably supported on the rods 28 and 32, as shown in Fig. 1.

The use of one or more carriages 29 to support the seaward end of a rod 28 is adapted to permit the motor driven carriage 6 to be positioned as far as possible from the float 3 and the action of the waves to prevent same from getting wet or otherwise damaged.

The motor 9 is supplied with electrical energy from a pair of spaced apart and connected trolley wheels 34 and 35 and another trolley wheel 36 supported on a trolley pole 37 secured to and shifted by the carriage 6. The trolley wheels 34 and 35 are adapted to intermittently and alternately engage, respectively, conductor sections 38 and 39 supported, respectively, at the upper and lower sides of a conductor support 40 supported within the superstructure above the carriage 6. The conductor sections 38 at the upper side of the support 40 and the conductor sections 39 at the lower side thereof slightly overlap each other in their longitudinal extent and are respectively separated from each other by means of insulating members 41 and 42 of the same thickness as the conductor sections, thus permitting smooth passage from the conductor sections over the insulating members to the next conductor section. The conductor sections 38 and 39 are connected respectively by means of conductors 43 and 44 with contact members or brushes 45 and 46, which are adapted to intermittently and alternately engage contact members at the periphery of a contact wheel 47 connected with a clock mechanism, not shown.

The contact wheel 47 is adapted to rotate once during a period of time required between ebb and ebb, or flow and flow tide, and is adapted to intermittently and alternately supply electrical energy to the adjacent and overlapping conductor sections 38 and 39 for shifting the carriage 6, and therefore the float 3, outwardly or seaward a certain distance during a certain interval of time and backwardly toward the shore a similar distance during a similar time depending upon whether the tide is ebb or flow.

The contact wheel 47 is made of insulating material and is provided with a plurality of contacts 48, 49, 50, 51, 52, 53 and 54 in its periphery, the contacts 48, 49, 50, 52 and 53 being positioned at the middle portion of the face intermediate the sides thereof, the contact 51 being positioned in the face near the one side of the wheel and the contact 54 being positioned in the face at the opposite side of the wheel, as shown best in the diagrammatic view in Fig. 10. The contacts 48, 49 and 50, as well as the contacts 51, 52, 53 and 54, are spaced on radial lines positioned at angles of 60° with each other, while the angle between the contacts 50 and 51, and 48 and 54, is 30°. The contacts 48, 49 and 50 are connected with a conductor ring 55 mounted on the wheel 47 and connected through a brush 56 and a conductor 57 with the positive terminal of a direct current generator 58. The remaining contacts on the wheel 47 are connected with another conductor ring 59 supported on the wheel 47, which ring 59 is connected through a brush 60 and a conductor 61 with the negative terminal of the generator.

The distance that the float 3 is adapted to travel seaward or landward between flood and ebb tide, or ebb and flood tide, to keep the float in water most irritated by the waves, is on an average sloping shore approximately three hundred feet. In the views shown in Figs. 1 and 9 are shown six conductor sections on the conductor support 40, which divides the whole distance to be traveled by the carriage 6 into fifty foot spaces over which the carriage 6 is adapted to travel during the contact of one of the brushes 45 or 46 with one of the contacts on the contact wheel 47. It will be here noted that the contact brush 45 is so positioned that the same cannot engage the contact 54, and the contact brush 46 is so positioned that the same cannot engage the contact 51.

With the contact wheel 47 in the position shown, a current passes from the generator 58 to the contact 48 to the brush 46 through the conductor 44 and the conductor sections 39. From these conductor sections a current is conducted through the trolley wheel 35 to the motor 9 on the carriage 6 back to the contact wheel 36, through the conductor 62, extending parallel with the other conductors above mentioned, through the conductor 63, the switch member 64 and the conductor 65 back to the generator 58. By the time the contact between the brush 46 and the contact 48 is ready to break by reason of the revolution of the wheel 47, the carriage 6 will have reached a position shown by the trolley wheels in Fig. 9, at which time the trolley wheel 35 will have passed beyond the one conductor section 39 onto the insulating member 42, as shown. As the wheel 47 continues to rotate, the contact 48 will engage the contact brush 45 electrifying the conductor sections 38 and passing a similar current to and through the motor 9 permitting the same to travel seaward another distance of fifty feet. At the end of the next interval the contact 49 engages the contact brush 46 and again electrifies the conductor sections 39 permitting the motor and carriage to proceed another interval in the same direction. This same procedure is carried on until after the contact 50 engages the contact brush 45 when the trolley wheel 34 will have reached the last conductor section 38. It will be noted that during this last interval the trolley wheel 34 does not leave the last conductor section 38 at the end of the time interval, since the current is automatically cut off by the engagement of a lug 66 on the motor 9 or carriage 6 which actuates a switch control lever 67. This lever 67 is pivotally connected at its one end on the support 40 and is pivotally connected intermediate its ends by means of a rod or cable 68 with a pivotally mounted switch member 64. As the lever 67 is shifted by the lug 66, as described, the circuit between the conductors 63 and 65 is broken, and the conductor 63 connected by means of the conductor 69 with the positive terminal of the generator. Thus it will be seen that when the trolley wheels reach the end of the last conductor section 38, two positive wires are connected from the generator with the motor 9 permitting the same to stand still.

As the next contact 50 is positioned to one side of the middle of the contact wheel, no contact of the same is made with the brush 46, but a contact at a regular interval is made between said contact 50 and the brush 45, which connects the last conductor section 38 with the negative terminal of the generator, and since the trolley conductor 62 is connected wtih the positive terminal of the generator, a current is passed through the motor 9 in the reverse direction, reversing its motion and permitting the same to proceed back to its starting point at intervals, as previously described. During the next interval the contact 52 of the wheel 47 engages the brush 46, and during the next interval, the brush 45. The contact 53 similarly engages at intervals the brushes 46 and 45. During the following interval the contact 54 engages the brush 46 carrying the trolley to the first conductor section 39, at which time the current is again reversed by the engagement of the lug 66 with the free end of the switch member 64.

To retain the carriage 6 in a stationary position at the end of each interval when the circuit is broken, I have provided a magnetically controlled brake mechanism, shown best in Fig. 8. This brake mechanism consists of a brake drum 70 which is secured to the shaft of the motor 9, a pair of oppositely disposed, semicircularly shaped brake members 71 pivotally mounted at their one ends on a lug on the brake casing 72, a bolt 73 and spring 74 for holding the brake members 71 against the periphery of the brake drum 70, a cam 75 pivotally mounted within the casing 72 between the free ends of the brake members, a lever 76 for rotating said cam, a shiftable slide connected with the lever 76 and an electro-magnet 80 for shifting said slide. The slide 77 is reciprocally mounted in a guide means 79 supported in the casing 72 and is provided at its one end with an iron core 77$^a$ which is adapted to be attracted by the electro-magnet 80 when the same is electrified. The slide 77 is pivotally connected with the free end of the lever 76 by means of a link 78. The cam 75 is so shaped that when the lever 76 is rotated with the cam 75 about their pivotal mountings in the casing 72, the free ends of the brake members 71 are separated, permitting the brake drum 70 to rotate freely. Thus it will be seen that when the motor 9 on the carriage 6 is electrified, the electro-magnet 80 connected with the same conductors is also electrified attracting its core 77$^a$ and shifting the slide 77 to the dotted line position, separating the brake members 71 from each other and from the brake drum 70 and permitting the motor to rotate freely. As soon as the circuit through the motor 9 is broken, the core 77$^a$ will automatically be released and permit the spring 74 to close the brake members 71 about the brake drum 70 and hold the motor 9 and carriage 6 in a fixed position until the electro-magnet 80 and the motor 9 are again electrified.

It is obvious from this construction, as illustrated in the drawings and disclosed in the foregoing specification, that there is provided a wave power producing apparatus, as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a wave power-producing apparatus, a pier structure provided with an open sided passage at one end, forming a guideway for a float, a float shiftably positioned in a longitudinal direction in said passage, and a propelling means adapted to be actuated by waves mounted on said float.

2. In a wave power-producing apparatus, a pier structure provided with an open sided passage at one end, forming a guideway for a float, a float shiftably positioned in a longitudinal direction in said passage, a propelling means adapted to be actuated by waves mounted on said float, and air compressing means mounted on said float operatively connected with said propelling means.

3. In a wave power-producing apparatus, a pier structure provided with a passage at one end, a float shiftably positioned in a longitudinal direction in said passage, a propelling means adapted to be actuated by waves mounted on said float, and a timed mechanism mounted on said pier structure and connected with said float adapted to shift the same longitudinally in said passage.

4. In a wave power-producing apparatus, a pier structure provided with a passage at one end, a float shiftably positioned in a longitudinal direction in said passage, a propelling means adapted to be actuated by waves mounted on said float, air compressing means mounted on said float operatively connected with said propelling means, and a timed mechanism mounted on said pier structure and operatively connected with said float for longitudinally shifting the same in said passage.

5. In a wave power-producing apparatus, a supporting and open sided guiding structure formed of a pair of rows of spaced piles with its one end extending into the water and provided with a passage at said end intermediate its sides, a float positioned in said passage and shiftable longitudinally therein, and a propelling means adapted to be propelled by waves revolubly mounted on said float.

6. In a wave power-producing apparatus, a supporting and open sided guiding structure formed of a pair of rows of spaced piles with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, and a conductor connecting said air compressing means with said storage tank.

7. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a conductor connecting said air compressing means with said storage tank, and a timed conveying mechanism mounted on said supporting and guiding structure and connected with said float for shifting the same longitudinally in said passage.

8. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a conductor connecting said air compressing means with said storage tank, a carriage shiftably mounted on said supporting and guiding structure, a motor mounted on said carriage, a means connecting said carriage with said float, a sectional conductor positioned contiguous to the path of said carriage, a trolley means mounted on said carriage adapted to engage said sectional conductor, and a timed switch mechanism alternately connecting the conductor sections of said sectional conductor with a source of electrical energy.

9. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, a generator mounted on said float and operatively connected with said propelling means, a carriage shiftably mounted on said supporting and guiding structure, a motor mounted on said carriage, a means connecting said carriage with said float, a sectional conductor positioned contiguous to the path of said carriage, a trolley means mounted on said carriage adapted to engage said sectional conductor, and a timed switch mechanism alternately connecting the conductor sections of said scetional conductor with a source of electrical energy.

10. In a wave power-producing apparatus, a supporting and guiding structure with its one end extending into the water and provided with a passage at said end intermediate its sides, a float positioned in said passage and shiftable longitudinally therein, a propelling mean adapted to be propelled by waves revolubly mounted on said float, an air compressing means mounted on said float and operatively connected with said propelling means a storage tank positioned on the shore, a flexible conductor connecting said air compressing means with said storage tank, and a plurality of carriages supporting said flexible conductor at intervals on said supporting and guiding structure.

11. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a flexible conductor connecting said air compressing means with said storage tank, a plurality of carriages supporting said flexible conductor at intervals on said supporting and guiding structure, an electrically driven carriage mounted on the one end of said supporting and guiding structure, and a connecting means flexibly connecting said carriage with said float.

12. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a flexible conductor connecting said air compressing means with said storage tank, a plurality of carriages supporting said flexible conductor at intervals on said supporting and guiding structure, an electrically driven carriage mounted on the one end of said supporting and guiding structure, a connecting means flexibly connecting said carriage with said float, and a timed switch mechanism connecting said motor at timed intervals with a source of electrical energy.

13. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a conductor connecting said air compressing means with said storage tank, a timed conveying mechanism mounted on said supporting and guiding structure and connected with said float for shifting the same longitudinally in said passage, a means at the ends of the path of said carriage and in connection with said motor for reversing the electrical current therethrough, and an electro-magnetically controlled brake mechanism in connection with said motor for permitting free revolution thereof when electric current flows therethrough.

14. In a wave power-producing apparatus, a supporting and guiding structure with its one end extending into the water and provided with a passage at said end intermediate its sides, a float positioned in said passage and shiftable longitudinally therein, a propelling means adapted to be propelled by waves revolubly mounted on said float, an air compressing means mounted on said float and operatively connected with said propelling means, a storage tank positioned on the shore, a conductor connecting said air compressing means with said storage tank, a carriage shiftably mounted on said supporting and guiding structure, a motor mounted on said carriage, a means connecting said carriage with said float, a sectional conductor positioned contiguous to the path of said carriage, a trolley means mounted on said carriage adapted to engage said sectional conductor, a timed switch mechanism alternately connecting the conductor sections of said sectional conductor with a source of electrical energy, a means at the ends of the path of said carriage and in connection with said motor for reversing the electrical current therethrough, and an electro-magnetically controlled brake mechanism in connection with said motor for permitting free revolution thereof when electric current flows therethrough.

In testimony whereof, I have hereunto set my hand at Los Angeles, California, this 13th day of November, 1924.

O. K. CLEAVELAND.